(12) United States Patent
Van Gestel et al.

(10) Patent No.: US 7,428,372 B2
(45) Date of Patent: Sep. 23, 2008

(54) APPARATUS AND A RECORD CARRIER FOR, AND A METHOD OF RECORDING A SEQUENCE OF VIDEO DATA SIGNALS

(75) Inventors: Wilhelmus Jacobus Van Gestel, Eindhoven (NL); Motoki Kato, Shinagawa-ku (JP); Masanobu Nakamura, Shinagawa-ku (JP); Kazuhiko Nakamura, Kadoma (JP); Tomotaka Yagi, Kadoma (JP)

(73) Assignee: Koninklijke Philips Electronics N.V., Eindhoven (NL)

( * ) Notice: Subject to any disclaimer, the term of this patent is extended or adjusted under 35 U.S.C. 154(b) by 855 days.

(21) Appl. No.: 10/502,831

(22) PCT Filed: Jan. 29, 2003

(86) PCT No.: PCT/IB03/00304

§ 371 (c)(1),
(2), (4) Date: Jul. 28, 2004

(87) PCT Pub. No.: WO03/065736

PCT Pub. Date: Aug. 7, 2003

(65) Prior Publication Data

US 2005/0117882 A1    Jun. 2, 2005

(30) Foreign Application Priority Data

Feb. 1, 2002    (EP) .................. 02075461

(51) Int. Cl.
*H04N 7/26* (2006.01)
*H04N 5/00* (2006.01)
(52) U.S. Cl. ...................................... 386/111; 386/125
(58) Field of Classification Search ................. 386/111, 386/109, 112, 124, 125, 45, 46, 52
See application file for complete search history.

(56) References Cited

U.S. PATENT DOCUMENTS 6,871,007 B1 * 3/2005 Saeijs et al. .................. 386/95
7,152,197 B2 * 12/2006 Blacquiere et al. .......... 714/755

* cited by examiner

*Primary Examiner*—Robert Chevalier
(74) *Attorney, Agent, or Firm*—Michael E. Belk

(57) ABSTRACT

An apparatus for recording a sequence of video data signals on a record carrier includes input structure for receiving video data signals, generating structure for generating characteristic point information signals, processing structure for processing the characteristic point information signals for a plurality of characteristic points into a sequence of characteristic points information signals (CPI) and writing structure for writing the sequence of video data signals and the sequence of characteristic points information signals on the record carrier. The characteristic point information signals identify a characteristic point in the sequence of video data signals. Various measures are proposed in relation to the CPI aiming at providing compact way of storing information related to a size of I-pictures.

17 Claims, 3 Drawing Sheets

APPARATUS AND A RECORD CARRIER FOR, AND A METHOD OF RECORDING A SEQUENCE OF VIDEO DATA SIGNALS

The invention relates to an apparatus for recording a sequence of video data signals on a record carrier, the sequence of video signals comprising pictures of an intra-picture type coded without reference to other pictures and pictures of an inter-picture type coded with reference to other pictures, the apparatus comprising:
input means for receiving video data signals;
generating means for generating characteristic point information signals, the characteristic point information signals identifying a characteristic point in the sequence of video data signals, the characteristic point information signals comprising a block of information, the block of information comprising:
position data defining a position of the characteristic point in the sequence of video data signals; and
size data providing information related to a size of an I-picture selected from the pictures of the intra-picture type;
processing means for processing the characteristic point information signals for a plurality of characteristic points into a sequence of characteristic points information signals; and
writing means for writing the sequence of video data signals and the sequence of characteristic points information signals on the record carrier.

The invention further relates to an apparatus for reproducing a sequence of video data signals comprising pictures of an intra-picture type coded without reference to other pictures and pictures of an inter-picture type coded with reference to other pictures, using for the sequence of video data signals a corresponding sequence of characteristic points information signals comprising characteristic point information signals for a plurality of characteristic points, the characteristic point information signals identifying a characteristic point in the sequence of video data signals, the characteristic points information signals comprising a block of information which comprises:
position data defining a position of the characteristic point in the sequence of video data signals; and
size data providing information related to a size of an I-picture selected from the pictures of the intra-picture type;

the apparatus comprising:
input means for receiving the sequence of video data signals and the corresponding sequence of characteristic points information signals;
extracting means for extracting the block of information from the sequence of characteristic points information signals; and
processing means for processing the sequence of video data signals into video data signals using the block of information.

In addition, the invention relates to a method of generating a sequence of information signals concerning characteristic points in a sequence of video data signals comprising pictures of an intra-picture type coded without reference to other pictures and pictures of an inter-picture type coded with reference to other pictures, in which for a characteristic point a block of information is generated, the block of information comprising:

position data defining a position of the characteristic point in the sequence of video data signals; and
size data providing information related to a size of an I-picture selected from the pictures of the intra-picture type.

Furthermore, the present invention relates to a record carrier provided with the sequence of video data signals and the sequence of characteristic points information signals.

The CPI (Characteristic Point Information) table maps the time axis (the moment a certain picture or scene is shown in the program) on the location (byte number) in the file, which contains the bytes from the program. This is especially important if the bit rate is not known or not constant. The characteristic points make it possible to have random access, based on presentation time, in the recorded program. FIG. 1 shows schematically location of characteristic points (CP) in the file. The axis P represents position in the file.

In FIG. 2 a schematic view is given of the layered structure of a storage device.

Files created in the AV-Application (APP) are sent to the File System layer (FS). Here a mapping of the bytes from the files on the logical address space which is delivered by the Bit Engine (BE) is made. This mapping is stored in the FS database.

In the Bit Engine the mapping of the logical address space on the physical address space is carried out. The files, which are created in the AV-application, are: the real-time files, which contain the content of the AV program and an AV database. The AV database contains the navigation data for access to the real-time files. The CPI table is part of the navigation data and it is stored in the AV data base file.

Characteristic points in case of an MPEG2 coded AV signal, on the time axis are:
the start of a so-called I-picture (intra-picture),
the start of a P-picture,
the start of an Audio access unit (in case of an Audio only signal).

The start of the I-picture is most important because decoding can start without the need of previous information. The start of a P-picture could be important if the previous I-picture (or P-picture) is also mentioned.

During operation the CPI table of the program, which is presented, is stored in (DRAM) memory of the Application layer. That is why the size of the CPI table should be limited. CPI tables can be very large, as is explained in next example.

The address from the position in the file is represented by the source packet number in that file. With an MPEG2 Transport Stream, each source packet consists of the Transport Stream packet of 188 bytes and a Time stamp of 4 bytes. With a capacity of 25 Gbytes we need 28 bits to represent this address of a characteristic point in the program.

The accuracy on the time access should be less than the duration of access units. With an accuracy of 5 msec and a total playing time of 24 hours we need 25 bits to represent the timing information.

The CPI table from a stored program might contain a lot of entries. The duration of a Group-Of-Pictures (GOP) is less than half a second. Each GOP starts with an I-picture. If an entry in the CPI table is made for all I-pictures, then there are for every hour playing time at least 7200 entries. The playing time of a large capacity disc could be very large (e.g. 12 hours), which results in about 100.000 entries.

With 4 bytes for the address and another 4 bytes for the presentation time we end up at a size of 800 Kbytes.

The CPI table is also used for trick play like fast forward and reverse. In trick play not all pictures can be presented. Very often only the I-pictures (I), or some of the I-pictures, are presented as shown in FIG. 3. So not all source packets have to be read but only those which are used for presentation. The size of the I-picture is not fixed, size could be tens or hundreds of Kbytes.

Reading of redundant information costs time, in that time another I-picture could have been read. This improves the trick play performance because more pictures per second could have been presented.

In some other systems this is solved by having for each entry in the CPI table not only the presentation time and the address in the file but also the size of the I-picture or the address of the source packet, which contains the last byte from the I-picture. The size of the I-picture is measured in source packets with a size of 192 bytes. The size of an I-picture could be several hundreds of Kbytes. More than 10 bits are needed to indicate the size of the I-picture. This would result in another 2 bytes for the entry in the table. The size of the table is increased and it is not 4 byte aligned anymore.

In the drive only units of ECC blocks (B) can be read. If only a few bytes are needed from a certain ECC block then still the whole ECC block has to be read.

It is of no use to indicate very accurately the size of the I-picture. This is schematically shown in FIG. 4. It is enough if it is known that only two ECC blocks have to be read instead of 5 ECC blocks. In the following paragraph some numbers are given which might occur in practice.

Bit rate of the MPEG Transport Stream is 8 Mbps (1 Mbytes per second).

One GOP is 0.5 second, so the average size of the GOP is 0.5 Mbytes.

The size of an ECC block is 64 Kbytes, so one GOP is in average 8 ECC blocks.

The maximum size of an I-picture is taken equal to the decoding buffer (~225 Kbytes, ~4 ECC blocks).

The average size of the I-picture is much less, it might be in the order of 100 Kbytes (<2 ECC blocks).

If it is indicated that the size of the I-picture is <128 Kbytes, then never more than 3 ECC blocks have to be read. If this size was not known then 5 ECC blocks had to be read.

The aim of this proposal is to have an indication for the size of the I-picture. So not more ECC blocks are read than is needed. But also to keep the number of bits for the size of the I-picture as low as possible. For this purpose we can use following property.

If the video type indicates that it is an entry for a P-picture, then the size is not important. P-pictures for trick play are only important at low speeds. Here either the end of the picture can be found while reading and as soon as the end is found a jump is made to the start of the next picture, or the whole stream is read.

These considerations have led to the structure of one entry in the CPI table shown in FIG. 5. Presentation time stamp (PTS) specifies a time during presentation of the sequence of video data when a particular picture is to be presented and a source packet number (SPN) specifies an address in the sequence of video data where the characteristic point is located. TYP contains information related to a type of the entry and a size of the I-picture. In this example the entry in the CPI table has a size of 4 bytes: 4bits for TYP, 11-bits for PTS and 17-bits for SPN.

In the 4 bits from TYP, the type of the video entry is presented together with the size of the I-picture. The type of the entry is given by bits b0 ... b3:

1xxx I-picture with sequence header, xxx represents the size of the picture.

0yyy I-picture without sequence header, yyy represents the size of the I-picture.

At least one of the bits in yyy is '1'

0000 P-picture

Examples of values for xxx and yyy are given in Table 1, where k is the scaling factor.

| xxx | yyy | Size of I-picture |
|-----|-----|-------------------|
| 000 | 000 | not relevant |
| 001 | 001 | <k*s1 |
| 010 | 010 | k*s1 ... k*s2 |
| 011 | 011 | k*s2 ... k*s3 |
| 100 | 100 | k*s3 ... k*s4 |
| 101 | 101 | k*s4 ... k*s5 |
| 110 | 110 | k*s5 ... k*s6 |
| 111 | 111 | >k*s6 |

As an example:
For standard definition TV (SD-TV): k=1
For high definition TV (HD-TV): k=2
and s1=64 kB
s2=128 kB
s3=192 kB
s4=256 kB
s5=320 kB
s6=384 kB In another example k-1 and: s1=128 kB, s2=256 kB, s3=384 kB, s4=576 kB, s5=896 kB, s6=1280 kB.

In yet another example TYP can have length of 3-bits with only 1-bit carrying information related to the I-picture size. Its value can be binary '1' for I-pictures with size smaller than 128 kB and binary '0' for cases when the size is not specified.

Figure 1:
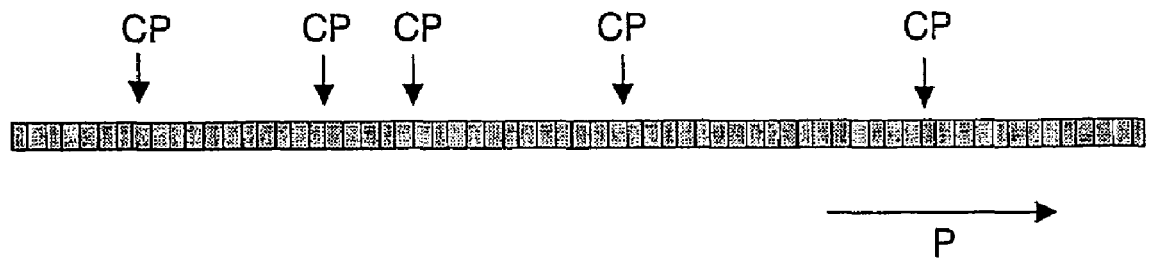
FIG. 1 shows schematically location of characteristic points (CP) in the file.
Figure 2:
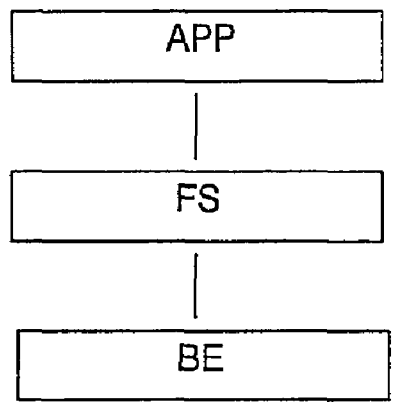
FIG. 2 shows a schematic view of the layered structure of a storage device.
Figure 3:
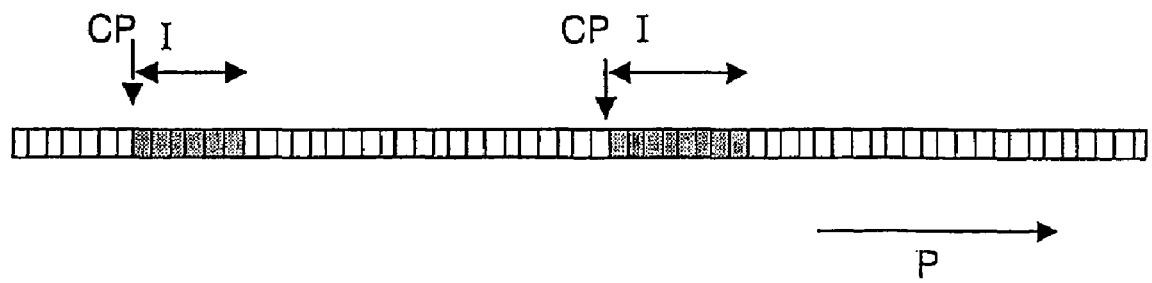
FIG. 3 shows schematically location of I-pictures (I) in the file.
Figure 4:
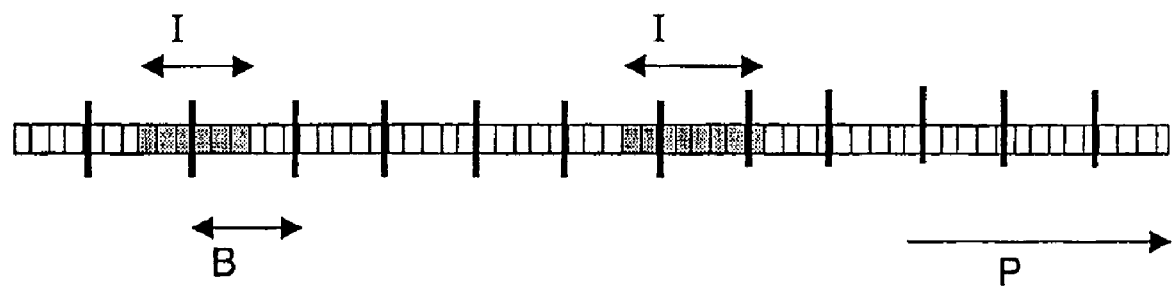
FIG. 4 shows schematically I-pictures (I) and ECC blocks (B).
Figure 5:
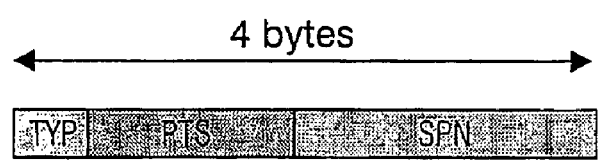
FIG. 5 shows example of one entry in the CPI table.
Figure 6:
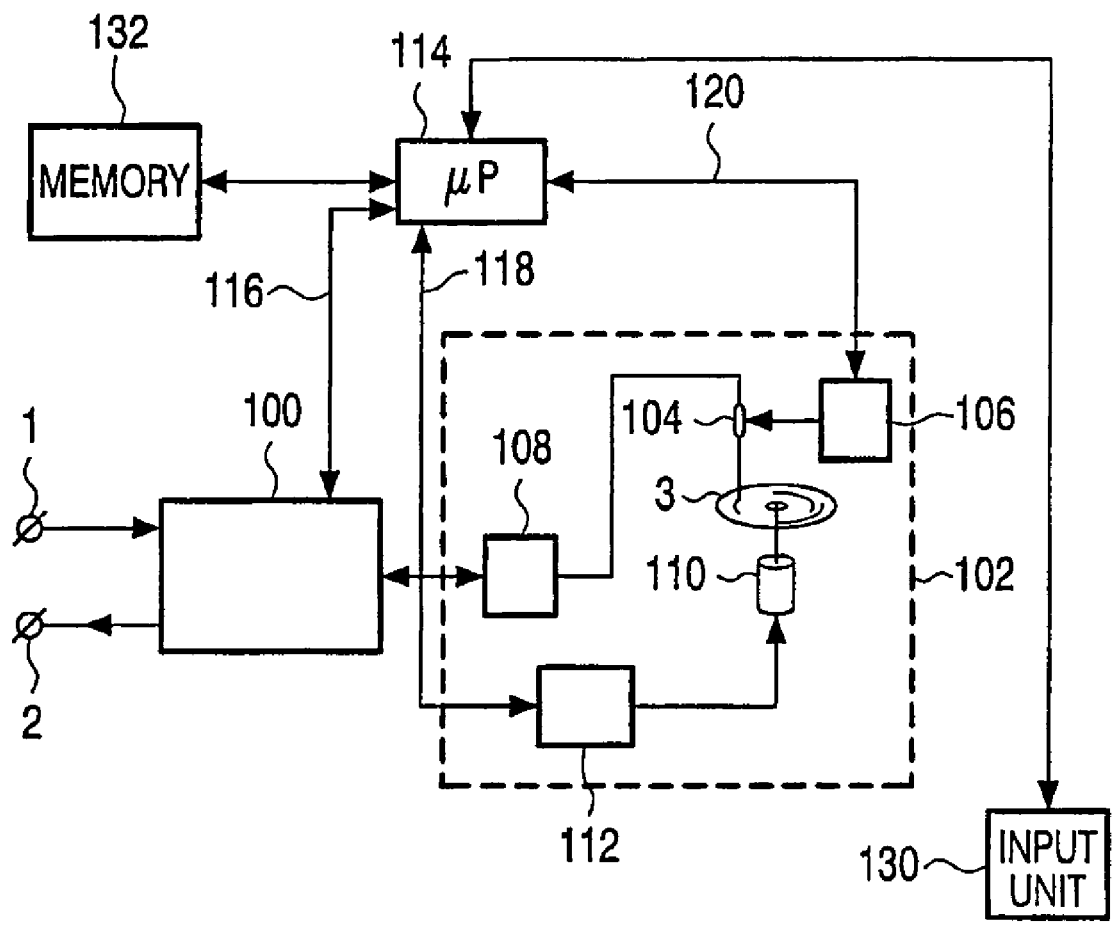
FIG. 6 shows an embodiment of the apparatus for recording a sequence of video data signals, in accordance with the invention.

FIG. 6 shows an embodiment of the apparatus for recording a sequence of video data signals, in accordance with the invention. The apparatus comprises an input terminal 1 for receiving video data signals and a video data signals processing unit 100. The signals processing unit 100 receives the video data signals via the input terminal 1 and processes the video data signals into a sequence of video data signals for recording the sequence of video data signals on a record carrier 3. Further, a read/write unit 102 is available. The read/write unit 102 comprises a read/write head 104, which is in the present example an optical read/write head for reading/writing the sequence of video data signals and a corresponding CPI from/on the record carrier 3. Further, positioning means 106 are present for positioning the head 104 in a radial direction across the record carrier 3. A read/write amplifier 108 is present in order to amplify the signal to be recorded and amplifying the signal read from the record carrier 3. A motor 110 is available for rotating the record carrier 3 in response to a motor control signal supplied by a motor control signal generator unit 112. A microprocessor 114 is present for controlling all the circuits via control lines 116, 118 and 120.

The signals processing unit 100 is further adapted to generate the corresponding CPI for the sequence of video data signals. To that purpose, the signals processing unit 100 is, as an example, capable of identifying position and size of an I-picture in the sequence of video data signals. Further, the signals processing unit 100 is capable of generating a block of information for a characteristic point corresponding to this I-picture, consisting of TYP, PTS and SPN as defined in above examples.

The CPI can be temporarily stored in a memory 132, until the processing of the video data signals into the sequence of video data signals and, eventually, the subsequent recording on the record carrier 3, has been completed. Next, the CPI stored in the memory 132 can be recorded on the record carrier 3.

The invention claimed is:

1. An apparatus for recording a sequence of video data signals on a record carrier, the sequence of video signals comprising pictures of an intra-picture type coded without reference to other pictures and pictures of an inter-picture type coded with reference to other pictures, the apparatus comprising:
   input means for receiving video data signals;
   generating means for generating characteristic point information signals, the characteristic point information signals identifying a characteristic point in the sequence of video data signals, the characteristic point information signals comprising a block of information, the block of information comprising:
   position data defining a position of the characteristic point in the sequence of video data signals; and
   size data providing information related to a size of an I-picture selected from the pictures of the intra-picture type;
   processing means for processing the characteristic point information signals for a plurality of characteristic points into a sequence of characteristic points information signals; and
   writing means for writing the sequence of video data signals and the sequence of characteristic points information signals on the record carrier;
   characterized in that the apparatus comprises:
   classifying means for classifying the size of the I-picture in a size interval out of a plurality of predefined size intervals;
   mapping means for mapping the size interval into the size data.

2. An apparatus as claimed in claim 1, characterized in that the classifying means are designed to classify the size of the I-picture according to a distribution of the size of the pictures of the intra-picture type.

3. An apparatus as claimed in claim 1, characterized in that the mapping means are designed to use one bit for the size data.

4. An apparatus as claimed in claim 1, characterized in that the classifying means are designed to use size intervals of different lengths.

5. An apparatus as claimed in claim 1, characterized in that the classifying means are designed to use the size intervals which are quantized in multiplies of a size of an error correction code cluster.

6. An apparatus as claimed in claim 1, wherein the block of information comprises an identification data identifying a type of a picture selected from the pictures of the intra-picture type and the pictures of the inter-picture type, the apparatus characterized in that the generating means are designed to combine the identification data with the size data.

7. An apparatus as claimed in claim 1, the record carrier being a disc-like optical record carrier, characterized in that the writing means comprise an optical read/write head, a positioning means for positioning the optical read/write head and moving means for rotating the record carrier.

8. An apparatus for reproducing a sequence of video data signals comprising pictures of an intra-picture type coded without reference to other pictures and pictures of an inter-picture type coded with reference to other pictures, using for the sequence of video data signals a corresponding sequence of characteristic points information signals comprising characteristic point information signals for a plurality of characteristic points, the characteristic point information signals identifying a characteristic point in the sequence of video data signals, the characteristic points information signals comprising a block of information which comprises:
   position data defining a position of the characteristic point in the sequence of video data signals; and
   size data providing information related to a size of an I-picture selected from the pictures of the intra-picture type; the apparatus comprising:
   input means for receiving the sequence of video data signals and the corresponding sequence of characteristic points information signals;
   extracting means for extracting the block of information from the sequence of characteristic points information signals; and
   processing means for processing the sequence of video data signals into video data signals using the block of information; characterized in that:
   the extracting means are designed to retrieve the size data and to map the size data into a size interval out of a plurality of predefined size intervals;
   the processing means are designed to use information related to the size interval.

9. An apparatus as claimed in claim 8, wherein the block of information comprises an identification data identifying a type of a picture selected from the intra-pictures and the inter-pictures, the apparatus characterized in that the means for extracting the block of information are designed to separate the identification data from the size data.

10. An apparatus as claimed in claim 8, characterized in that the input means are designed to receive the sequence of video data signals and the corresponding sequence of characteristic points information signals from a record carrier.

11. An apparatus as claimed in claim 10, characterized in that the input means are designed to receive the sequence of video data signals and the corresponding sequence of characteristic points information signals from a disc-like optical record carrier.

12. A method of generating a sequence of information signals concerning characteristic points in a sequence of video data signals comprising pictures of an intra-picture type coded without reference to other pictures and pictures of an inter-picture type coded with reference to other pictures, in which for a characteristic point a block of information is generated, the block of information comprising:
   position data defining a position of the characteristic point in the sequence of video data signals; and
   size data providing information related to a size of an I-picture selected from the pictures of the intra-picture type; characterized in that,
   the size of the I-picture is classified in a size interval out of a plurality of predefined size intervals; and
   the size interval is mapped into the size data.

13. A method as claimed in claim 12, characterized in that the size of the I-picture is classified in the size interval according to a distribution of sizes of the pictures of the intra-picture type.

14. A method as claimed in claim 12, characterized in that one bit in the block of information is used for the size data.

15. A method as claimed in claim 12, characterized in that the size intervals have different lengths.

16. A method as claimed in claim 12, characterized in that the size intervals are quantized in multiplies of a size of an error correction code cluster.

17. A method as claimed in claim 12, wherein the block of information comprises an identification data identifying a type of a picture selected from the pictures of the intra-picture type and the pictures of the inter-picture type, characterized in that the identification data is combined with the size data.

* * * * *